United States Patent [19]

Cowley et al.

[11] Patent Number: 4,850,839

[45] Date of Patent: Jul. 25, 1989

[54] EXTRUSION APPARATUS

[75] Inventors: Richard Cowley, Ely; Peter Wills, Somersham, both of United Kingdom

[73] Assignee: Barwell International Limited, Swavesey, United Kingdom

[21] Appl. No.: 217,720

[22] Filed: Jul. 11, 1988

[30] Foreign Application Priority Data

Jul. 14, 1987 [GB] United Kingdom ................. 8716589

[51] Int. Cl.[4] ...................... B29C 47/54; B29C 47/56
[52] U.S. Cl. .................................... 425/142; 425/308; 425/376.1
[58] Field of Search ............................ 425/215-217, 425/131.1, 132, 135, 142, 308, 310, 311, 289, 376.1, 309

[56] References Cited

U.S. PATENT DOCUMENTS

| | | | |
|---|---|---|---|
| 2,444,943 | 7/1948 | Miller | 425/308 |
| 2,634,691 | 4/1953 | Flockhart | 425/308 |
| 4,077,754 | 3/1978 | Borcher et al. | 425/311 |

FOREIGN PATENT DOCUMENTS

| | | | |
|---|---|---|---|
| 568274 | 8/1960 | Belgium . | |
| 1007053 | 4/1957 | Fed. Rep. of Germany . | |
| 1382291 | 11/1964 | France | 425/132 |
| 1141033 | 1/1969 | United Kingdom . | |

*Primary Examiner*—Willard Hoag
*Attorney, Agent, or Firm*—Albert L. Jeffers; Anthony Niewyk

[57] ABSTRACT

A disclosure relates to an apparatus for extruding and forming blanks from a rubber or polymeric material comprising a pair of hydraulic ram operated extruders having outlets connected to a common delivery conduit. A screw extruder is also connected to the conduit and a control valve controls flow between the respective extruders and conduit such that in one position of the valve one of the ram operated extruders is connected to the conduit outlet delivery of extrudate and the other extruder is connected to the screw extruder to receive a fresh charge of extrudate. A closed hydraulic circuit links the hydraulic rams of the two ram extruders whereby filling of one of the extruders causes that ram to retract and pump the hydraulic fluid therefrom to the other extruder to cause that ram to extend and thereby discharge the extrudate therein and vice versa. By feeding extrudate from the screw extruder, the hydraulic ram extruder being charged is caused to receive extrudate and the ram extruder discharging extrudate is caused to discharge extrudate. A cutter mechanism is provided at the outlet of the conduit severing the extrudate repeatedly at a rate determined by the advance/retraction of one of the hydraulic ram extruders to form blanks of substantially equal volume.

9 Claims, 9 Drawing Sheets

EXTRUSION APPARATUS

BACKGROUND OF THE INVENTION

1. Field of the invention

This invention relates to apparatus for forming and severing an extrudate of a flowable material into separate blanks of controlled volume. Such an apparatus is commonly known as a "preformer".

2. Background prior art

U.K. Patent Specification No. 1141033 describes and illustrates "Preformers" which have been used for the manufacture of rubber moulding blanks for compression moulding since 1966, when Barwell Engineering Limited first introduced an accurate means of extruding rubber through a die, and cutting it at the die face before swell could occur. In this case, accuracy was achieved by monitoring and controlling the volume of rubber being extruded, and this was made possible by using a hydraulic ram extruder. The limitations of this technology are:

(a) The machines have to be fed with pre-warmed rubber which is of reasonably even plasticity throughout and relatively air-free. This usually requires the use of a rubber mill, which is an expensive piece of machinery to buy and run.

(b) A ram extruder is a batch-type machine and hitherto could not be made to operate on a continuous basis.

(c) It is necessary to draw vacuum from the material in the extrusion barrel before commencing an extrusion operation.

Barwell also produced an extrusion apparatus intended to provide a continuous extrusion in which two hydraulic-ram extruders were connected through a switch-over valve to a common outlet conduit. There were difficulties with this arrangement in maintaining a uniform extrusion rate during changeover from one extruder to the other.

In later years, further developments were made by Barwell and others to meet the demand from the industry for a cold-fed machine, to eliminate the problems of pre-warming the rubber. These attempts involved the use of a cold-feed screw extruder to masticate the rubber and induce heat through friction as it passed through the barrel. The rubber was then fed into a conventional ram extruder for the preforming operation to take place. A further development was the use of a rotary encoder to monitor the movement of the ram, and thus control the operation of the knife to achieve the accuracy required. This is an alternative to using a fixed cutter speed and controlling the volume of the extrudate.

Although a section of the industry continues to want a fairly sophisticated preformer capable of being fed semi-automatically with cold rubber compound, the above two attempts made so far have not been wholly successful. The first is too complicated, difficult to clean and will only work with a limited range of rubber compounds. The second is too large and expensive to interest the majority of potential users.

German Patent Specification No. 1007053 discloses another approach in which an extruder comprises a pair of extruder cylinders which are fed alternately by a plasticizing screw extruder under the control of a changeover switch, the arrangement being such that when one cylinder is extruding, the other is being recharged. Whilst this arrangement enables a continuous flow of extrudate to be produced, there is no precise control over the flow rate of extrudate delivered since each extruder cylinder operates independently of the other.

A similar arrangement is disclosed in Belgian Patent Specification No. 568274 in which an injection process for manufacturing, profiled blanks from a plastics material is disclosed in which a basic material to be injected is continually plasticized and is introduced alternately into first and second dosage chambers in such a way that, whilst one dosage chamber is being filled, the material contained in the other dosage chamber is being dispensed into the injection mould cavity. The plastification apparatus comprises a endless screw for working and pushing forward the material to be injected, this screw being driven continuously and the dosage chambers comprise two hydraulic ram operated extrusion cylinders. Each extrusion cylinder is operated independently of the other and there is no provision for precise control of the volume flow rate of the extrudate. Other similar forms of extrusion apparatus are described and illustrated in British Patent Specification No. 604,241 and British Patent Specification No. 1,137,430.

SUMMARY OF THE INVENTION

This invention provides an apparatus for extruding and forming blanks from a flowable material comprising a pair of hydraulic ram operated extruders having outlets for delivering an extrudate of said flowable material, means (e.g. a screw extruder) having an outlet for feeding a supply of the flowable material to be extruded, valve means connecting the supply to the outlets of the ram extruders and having a common outlet for delivery of extrudate from one or other of the ram extruders, the valve means being operable to connect the supply means to one of the ram extruders to fill that extruder whilst the other extruder is connected to the common outlet to deliver extrudate thereto and vice versa a closed hydraulic circuit linking the hydraulic rams of the two ram operated extruders whereby filling of the extruder of one ram operated extruder causes the hydraulic ram of that extruder to retract forcing hydraulic fluid from that ram through the hydraulic circuit to the ram of the other extruder to extend that other ram of the other extruder to discharge material in the extruder through the valve mechanism to the common outlet and vice versa and means to sever repeatedly the extrudate at the outlet in accordance with the rate of delivery of extrudate to form blanks of substantially equal volume.

DESCRIPTION OF THE PREFERRED EMBODIMENT

Figure 1:
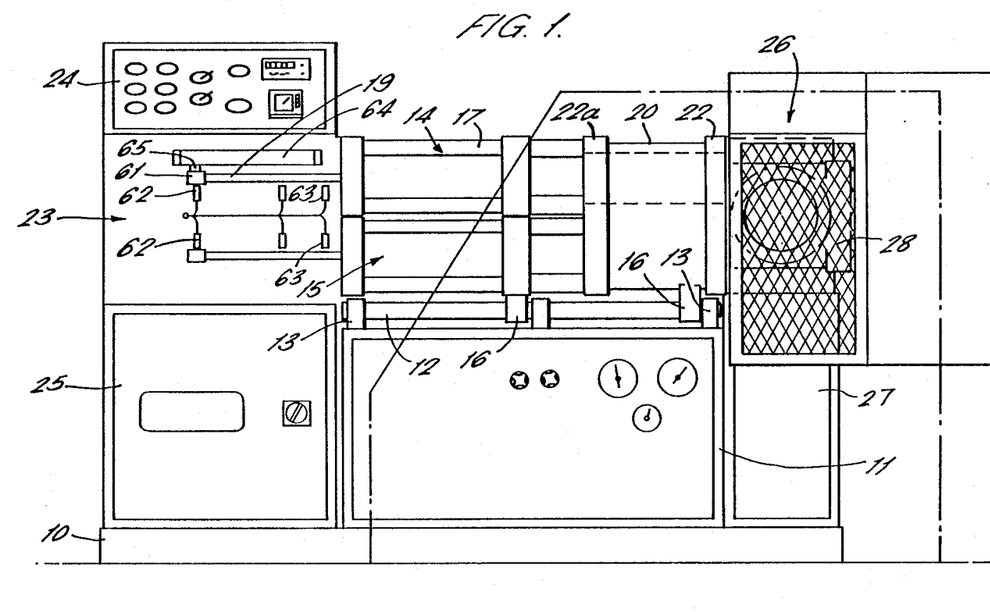
FIG. 1 is an elevation view of a preformer apparatus embodying twin hydraulic ram extruders having a common valve control outlet and fed by a screw extruder.

Referring firstly to FIG. 1 of the drawings, there is shown a preformer for forming equal volume blanks from a supply of flowable material such as rubber or other polymeric material and which may be subjected to a subsequent moulding to produce a final required shape.

Figure 2:
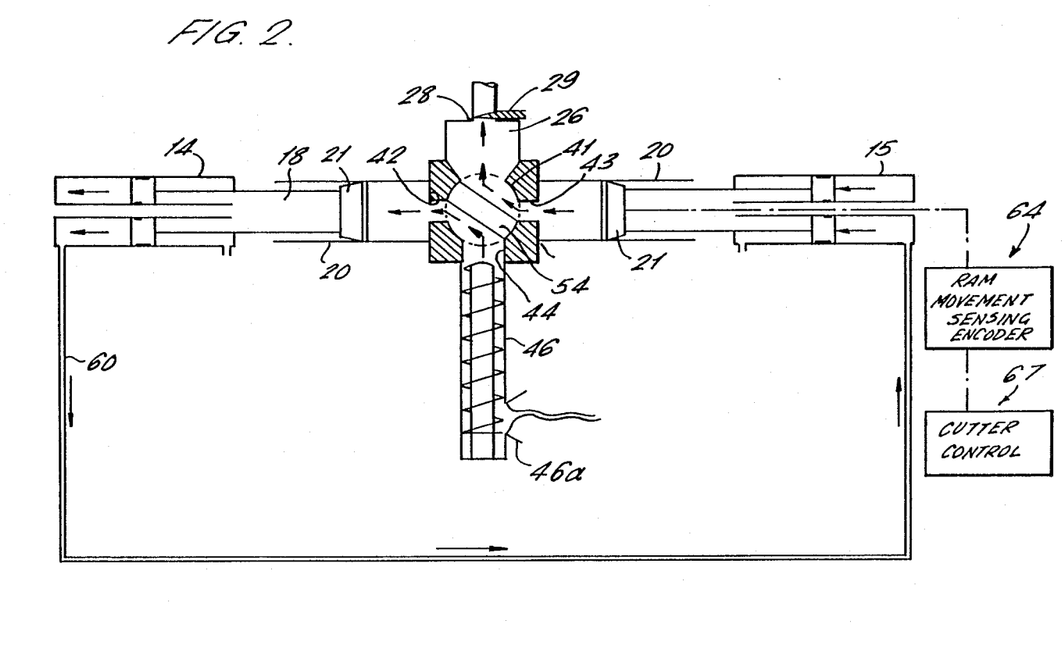
FIG. 2 is a diagrammatic view of the preformer of FIG. 1 including part of a hydraulic circuit between the hydraulic rams of the extruder.

The preformer apparatus comprises a base 10 on which a main chassis 11 is mounted which encloses a hydraulic power pack and valve gear which will be described in detail later in conjunction with the hydraulic circuit. A horizontally spaced pair of slide rails 12 is mounted on the chassis in spaced bearers 13 secured to the chassis. A vertically stacked pair of horizontally extending hydraulic ram operated extruders 17 is mounted on the slide rails by means of spaced slides 16 to enable the extruder assembly to be moved along the chassis for a purpose to be described later. Each hydraulic ram operated extruder comprises a double acting hydraulic ram 14, 15 having a main forwardly extending piston rod 18 projecting from the front of the ram (see FIG. 2) and a subsidiary rearwardly extending reduced diameter piston rod 9 projecting from the rear of the ram. The forward end of each hydraulic ram is connected to a respective rearward end of an extrusion barrel 20 and the piston rod 18 of the ram extends into the extrusion barrel and is connected to an extrusion piston 21 again as shown in FIG. 2.

The extrusion barrels of the upper and lower extruders have common front and rear mounting plates 22, 22a which secure the barrels together and the forward ends of the hydraulic cylinders 14, 15 are secured to the rear mounting plate 22. The rearwardly extending small diameter piston rods 19 from the hydraulic rams extend into and form part of a control section for the apparatus indicated at 23 which will be described later and above which there is a control panel 24 and below which there is a cabinet 25 containing various electrical systems for the apparatus. It will be understood that the cabinet for the control systems may be positioned at any convenient location on or near the apparatus. At the forward end of the extrusion barrels 20, there is an extrusion head indicated generally at 26 which is hinged about a vertical axis to swing into and out of engagement with a control valve mounting plate 30 (see FIG. 4) which in turn is mounted on a supporting structure 27. The head includes an outlet 28 for extrudate containing a die (not shown) to shape the extrudate which is swept by a motor driven cutter 29 (see FIG. 2) to sever the extrudate where it emerges from the die at controlled intervals. The cutter mechanism is enclosed within a mesh guard.

The control valve will now be described in greater detail with references to FIGS. 4 to 8.

Figure 4:
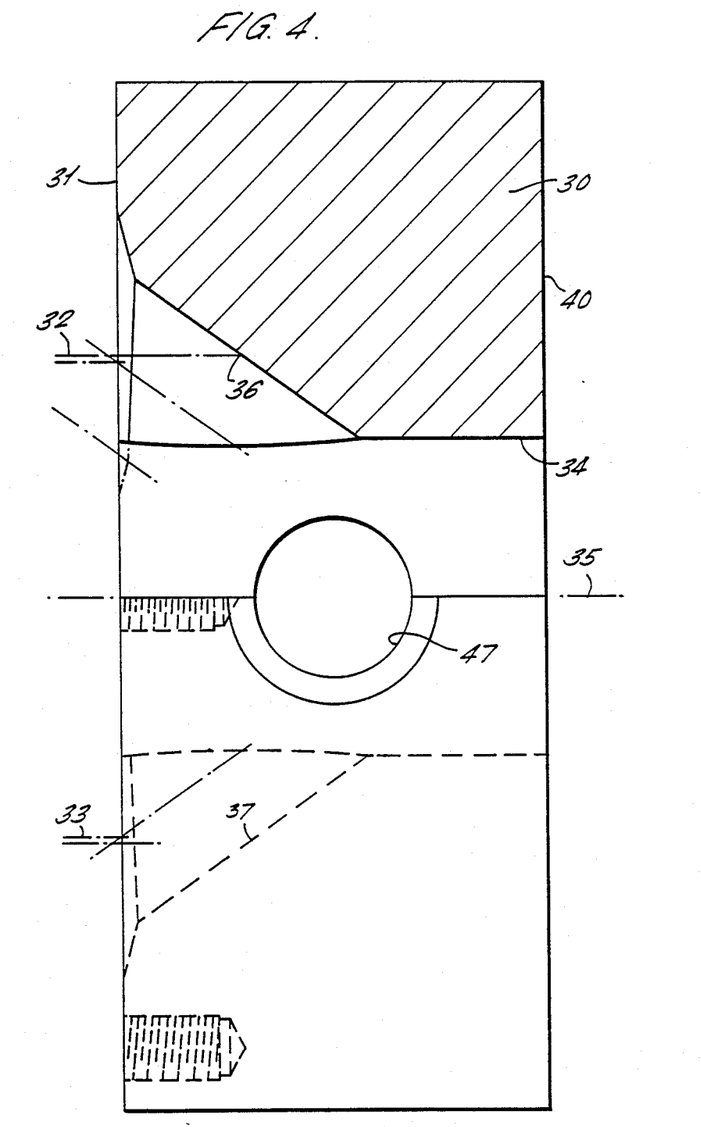
FIG. 4 is a part-section/part-elevation view of a mounting body for the hydraulic ram and screw extruders incorporating the control valve.

Referring firstly to FIG. 4, there is shown a valve mounting plate 30 having a side face 31 with which the forward mounting plate 22 carrying the forward ends of the extruder barrels abuts. The axis of the upper and lower extruder barrels are indicated at 32 and 33 respectively. The plate 30 has a through way 34 extending from the face 31 through the plate on an axis 35 and inclined passages 36, 37 part cut on the upper and lower sides of the passageway 34 opposite the ends of the upper and lower extruder barrels to direct flow therefrom into the passageway.

Figure 5:
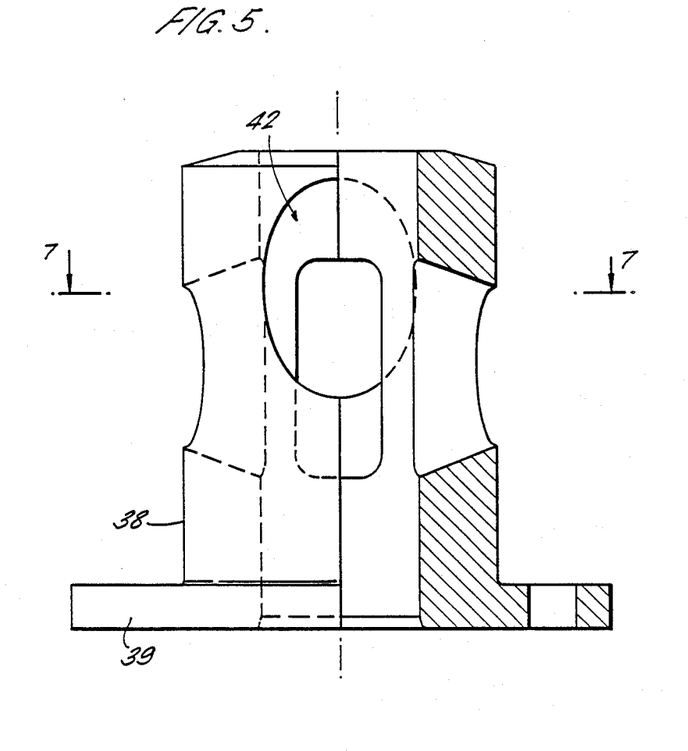
FIG. 5 is a partly sectioned elevation view of a sleeve of the control valve.
Figure 6:
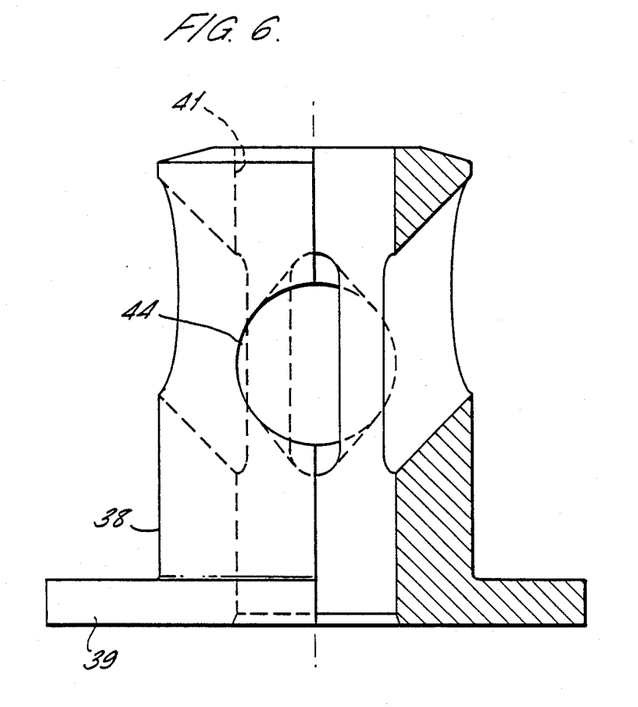
FIG. 6 is a side view of the sleeve shown in FIG. 5.
Figure 7:
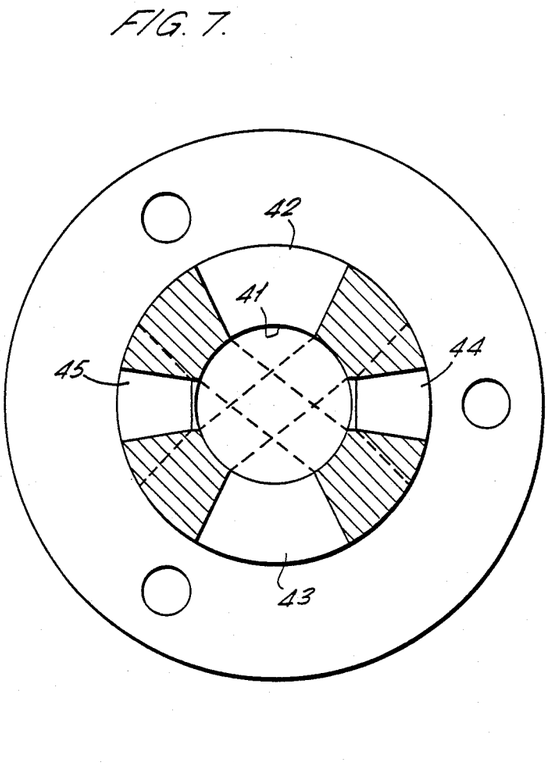
FIG. 7 is a section through the sleeve on the line 77 of FIG. 5.

The passageway 34 contains a ported sleeve 38 as shown in FIGS. 5 to 7 which extends through the passage 34 and has an end 39 secured to side 40 of plate 30. The sleeve 38 has a central cylindrical bore 41 with upper and lower ports 42, 43 extending through the sleeve to connect the passageways 36, 37 in the plate o the inner bore of the sleeve. The ports 42, 43 at the outer periphery of the sleeve are generally elliptical in shape as best seen in FIG. 5 and at the inner bore 41 of the sleeve are generally rectangular. The sleeve has a further pair of horizontally extending ports 44, 45 each of which is circular in cross section at the outer periphery of the sleeve and is of elongate form with rounded ends at the bore 41 as best seen in FIG. 6. The port 44 on one side of the sleeve communicates with the outlet end of a screw extruder as shown diagrammatically in FIG. 2. The screw extruder is a conventional type having an electric drive motor (not shown) an inlet port 46a through which cold strips of rubber or other polymeric material or flowable material to be extruded by the apparatus is fed to the screw to be fed to the valve. In passing along the barrel of the screw extruder, the rubber material is masticated and pre-heated and any air trapped in the rubber is released. Consolidated pre-heated rubber is thus delivered to the valve under pressure. The other port 45 in the sleeve communicates directly with a circular cross section outlet passage 47 in the valve plate 30 which terminates in the aforesaid outlet 28 containing the extrusion die.

Figure 8:
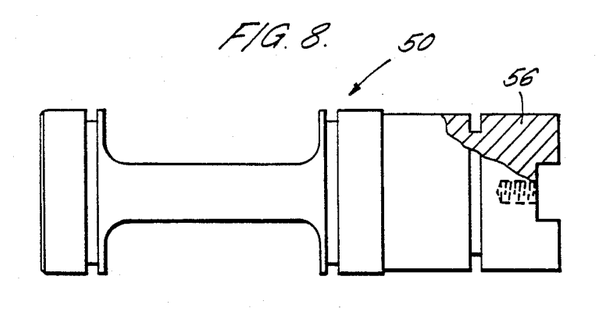
FIG. 8 is an elevation view of a movable valve member for the control valve.
Figure 9:
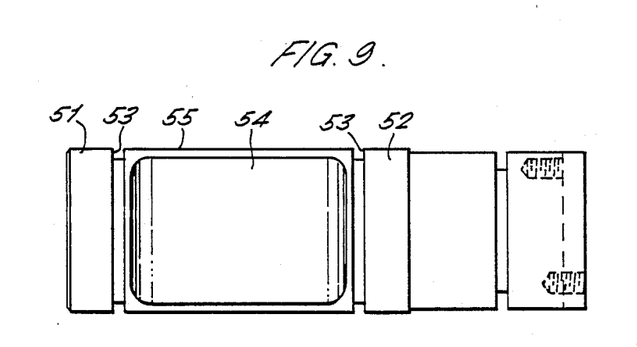
FIG. 9 is a plan view of the control member of FIG. 8.

Flow through the ports 42, 43, 44 and 45 is controlled by a valve member 50 illustrated in FIGS. 8 and 9 of the drawings which has a spaced pair of hubs 51, 52 each provided with annular channels 53 for seal in the bore 41 to either side of the ports. Between the hubs, the valve member is of plate form as indicated at 54 having part cylindrical sides 55 to engage in the bore. The valve plate is movable between the position shown in dotted outline in FIG. 7 to connect the port 44 which leads from the screw extruder to port 42 or to port 43 to charge one or other of the extruder barrels 20 (see FIG. 2). Simultaneously, port 45 leading to the extrusion outlet is connected to the other of the extruder barrels to receive flow of extrudate therefrom. The valve member 50 has an extension 56 at one end which is coupled to a double acting hydraulic ram to rotate the spindle between the positions indicated in dotted outline in FIG. 7. In switching port 44 from port 42 to port 43, the valve member is rotated across the face of port 44 to reduce and then momentarily cut off flow from the screw extruder through the valve during changeover. The arrangement thus minimising any pressure surge travelling through the valve system and thence to the extruder outlet during changeover. As can be seen from FIG. 7, the valve member sweeps through an angle of approximately 76 degrees during changeover.

Reference will now be made to FIG. 2 of the drawings which illustrates the apparatus diagrammatically before the description of the hydraulic and electrical control circuits is completed. As indicated previously, a screw extruder 46 delivers rubber or other polymeric material in pre-heated form to the control valve for extrusion through the head 26. With the valve member 54 in the position shown, the extrudate from the screw is delivered through the ports and passages in the valve to the lefthand extruder barrel 20, that is the upper of the two extruder barrels. It should be noted that the two ram operated extruders illustrated in FIG. 2 have been opened out into horizontally opposed merit for the sake of illustration. The outer ends of the hydraulic cylinders 14, 15 are directly connected by a conduit 60 so that as rubber is forced into the lefthand extruder barrel 20, the piston 21 in the barrel is forced back along the barrel and this in turn forces the piston of the ram back along its cylinder 14. Hydraulic fluid is discharged from the rearward end of the barrel 14 through the conduit 60 and thence into the rearward end of the righthand hydraulic ram 15 causing the piston therein to advance.

Advance of the piston causes a corresponding advance of the piston 21 of the righthand extruder barrel 20 and rubber filled in the barrel from a previous filling operation is delivered by the piston through the ports and passages in the control valve to exit from the head outlet 28 where it is severed by the aforesaid cutter 29. The control system 23 monitors movement of the upper hydraulic ram and, when he ram has advanced almost to its full stroke, the changeover valve 54 is operated by its ram to switch flow of extrudate from the screw extruder from the lefthand extruder barrel to the righthand extruder barrel. In so doing the flow out of the righthand extruder barrel to the outlet die is cut off and the lefthand extruder barrel is opened to the outlet 28. As screw extruder 46 delivers extrudate to the righthand extruder barrel, its piston is forced to retract and so a flow of hydraulic fluid through the conduit 60 is then established in the opposite direction causing ram 14 to advance the extrusion piston in the lefthand extrusion barrel 20 and to deliver extrudate through the valve to the outlet 28. When the lower cylinder 15 has retracted by almost its full stroke indicating that the lower extrusion barrel has been filled with fresh rubber to be extruded, the changeover valve is again operated to switch over flow from the screw extruder to the newly discharged extruder barrel and to connect the freshly charged extruder barrel with the extrusion outlet 28 to continue the extrusion operation.

Piston rods 19 extending from the rear ends of the upper and lower hydraulic rams 14, 15 carry a trigger elements 61 for operating spaced proximity sensors 62, 63 disposed along the path of the trigger elements as they move with extension and retraction of the piston rod to define the limits of the stroke of the ram. Control signals are fed from the proximity switches 62, 63 through a control system to initiate operation of the changeover valve 50 as described later. In automatic mode, the rams move in opposite directions and a control signal is produced by the control system to switch the change over valve only when the proximity switches at opposed ends of the travel of the two rams have been operated. A linear encoder 64 is also mounted above the path of the upper piston rod 19 and co-operates with an element 65 mounted on the piston rod to measure linear movement of the piston rod with a resolution by way of example, of 5 micrometers. The linear encoder is of a conventional optical type used for accurately detecting displacement.

Figure 10:
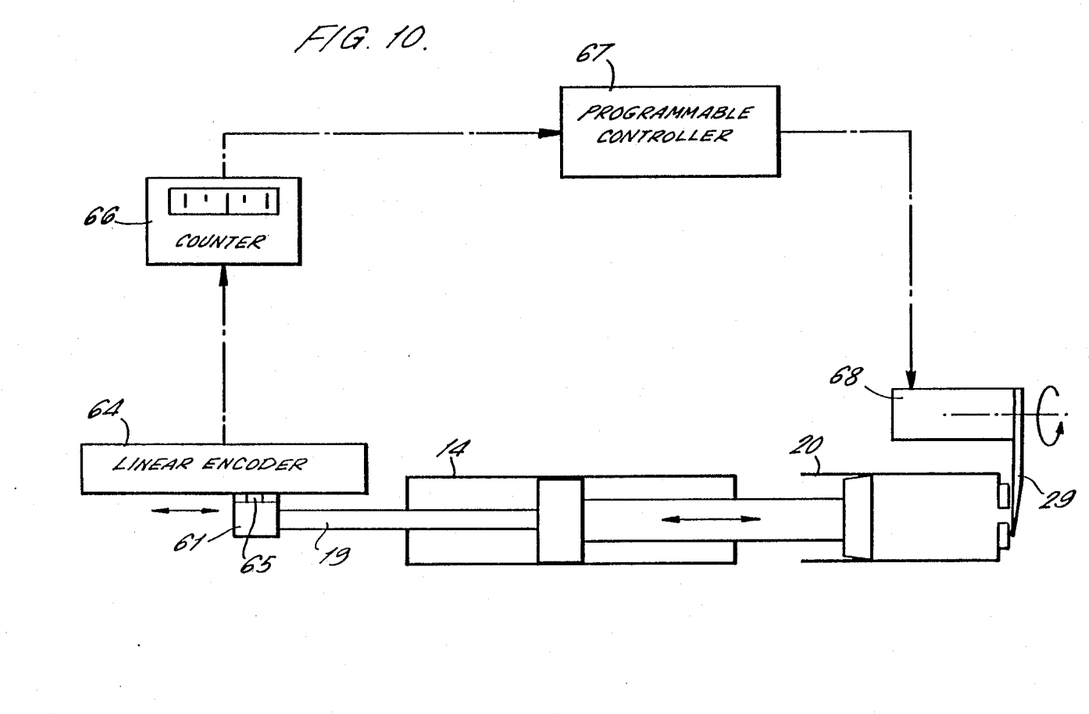
FIG. 10 is a diagrammatic view of a control circuit for controlling a die face cutter severing the extrudate at the outlet from the control valve.

Referring to FIG. 10 of the drawings, the encoder 64 has an output connected to a presettable counter 66 which gives an output when a preset count has been reached to a programmable controller 67 and, at the same time, re-sets itself to zero. The controller 67 has an output to a clutch unit 68 in an electric motor drive for the extrusion cutter 29 at the die outlet. Thus the counter 66 is set to give an output when the encoder indicates a predetermined advance or retraction by the upper hydraulic ram indicative of a corresponding volume of extrusion through the outlet 28 whichever of the rams is being used to extrude. A signal from the counter through the programmable controller 67 causes the brake on the cutter drive to be released and the clutch to be engaged. The motor then rotates the cutter by a single revolution sweeping the cutter blade across the die outlet to sever the extrudate and the brake automatically re-engages. At the same time as issuing the signal signalling to the controller, the counter re-sets itself to zero and immediately re-commences counting signals from the encoder (corresponding to steps in the advance of the ram as described above) until the preset figure is again reached and the cutter is then again operated.

Figure 3:
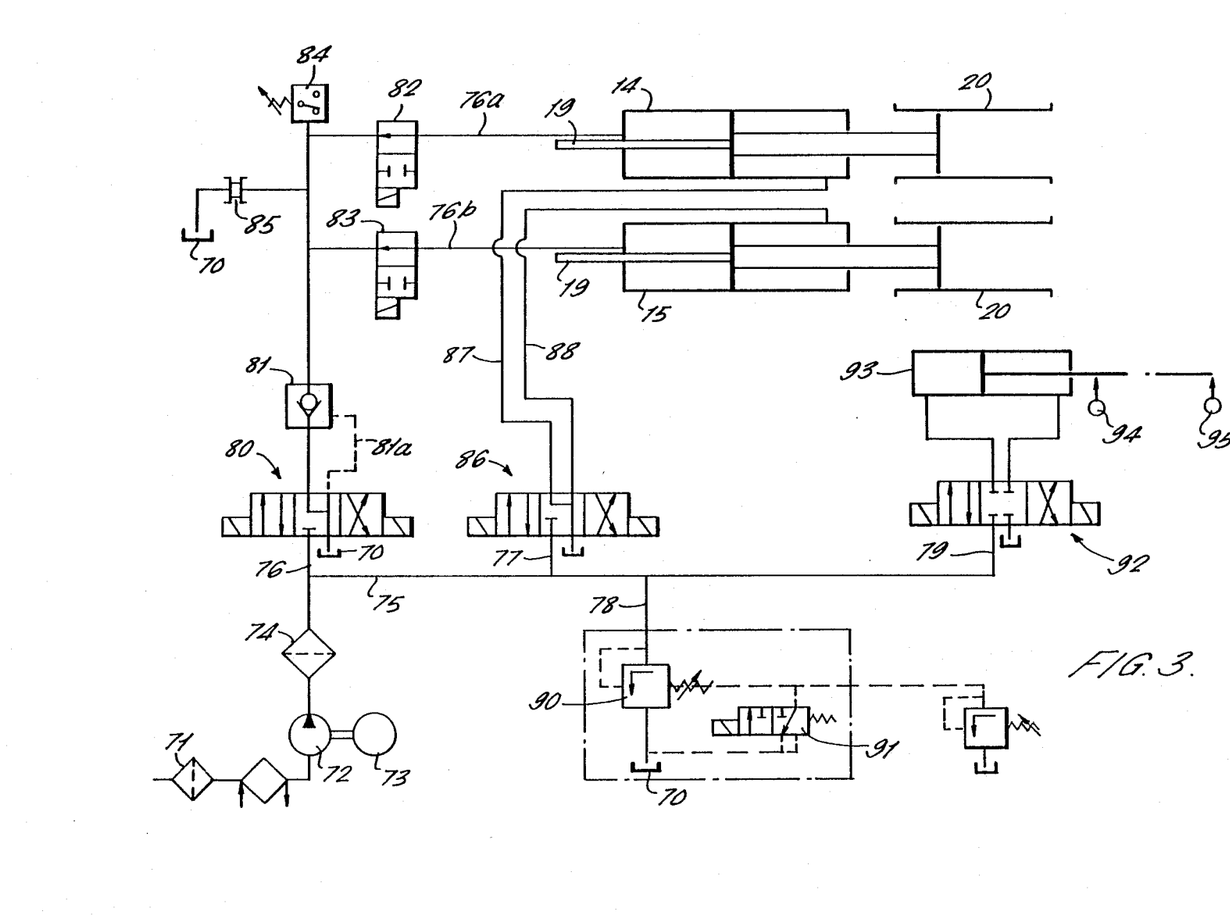
FIG. 3 is a diagrammatic view of the complete hydraulic circuit.

Reference will now be made to FIG. 3 of the drawings which illustrates the hydraulic circuit for the apparatus. Hydraulic fluid is drawn from a supply tank which will be indicated throughout the diagram by the reference numeral 70 through a filter 71 by a pump 72 driven by an electric motor 73. Fluid is delivered through a further filter 74 to a line 75 having four parallel branches 76, 77, 78 and 79. Branch 76 contains a three position solenoid operated valve 80, a pilot operated check valve 81 and divides into two branches 76a, 76b leading respectively to the rearward ends of the hydraulic ram cylinders. Each branch 76a, 76b contains a solenoid operated on/off valve 82, 83 respectively. The branch 76 also has a pressure control switch 84 and a safety burst disc 85 connected to tank 70. The three position valve 80 has a forward position providing flow to the rams through the conduit 76 (the check valve 81 being opened by direct supply pressure); a return position in which pressure is connected from the supply 76 through a branch 81a to the operating side of the check valve 81 to open the valve and the conduit 76 downstream of the valve is connected to tank 70 and a neutral position in which the operating side of the check valve is connected to tank to close the valve and flow through the valve from the pump supply is closed off. The combination of valve 80 with valves 82 and 83 enables one or other or both of the rams 14, 15 to be advanced as required at the commencement of operations or at the termination of an extrusion operation. In addition, with valve 80 in the neutral position and both valves 82, 83 open, branches 76a, 76b provide a closed circuit between the rearward ends of rams 14, 15 constituting the circuit 60 illustrated diagrammatically in FIG. 2 and referred to above. Branch 77 contains a three position valve 86 having a pair of outlet conduits 87, 88 respectively which lead to the forwards ends of rams 14, 15. The valve has top and bottom positions in which pressure can be supplied to the top cylinder with return flow from the bottom cylinder and vice versa for retraction of the top and bottom rams respectively in conjunction with operation of valve 80. Valve 86 also has a neutral position in which the forward ends of the rams are connected to tanks.

Branch 78 leads through a pressure relief valve 90 operated by a control valve 91 to tank 70. The pressure valve when closed maintains a pressure of, for example 3000° p.s.i. in the circuit and, when opened, allows the supply from the pump to be delivered direct to tank at minimal pressure. Branch 79 is connected through a three position valve 92 to opposite ends of a double acting hydraulic ram 93 for actuating the aforesaid changeover valve member 50. The valve 92 which is solenoid controlled has one position for advancing the ram 93, a neutral position for locking the ram and a third position for retracting the ram. Sensors 94, 95 are mounted in the path of movement of the ram to control advance and retract of the ram through the valve 92 to limit rotation of the valve plate 54 between the two positions illustrated in FIG. 7.

The pairs of proximity switches 62, 63 which detect the limits of movement of the piston rods 19 projecting from the rearward ends of the hydraulic cylinders 14, 15 are connected in the controller 67 which control operation of the various solenoid actuated valves in the hydraulic circuit.

The operation of the circuit will now be described starting from a state in which the extrusion barrels are empty of compounds.

Both hydraulic cylinders are extended to their forward positions as detected by sensors 63. This is achieved by the hydraulic pump and various solenoid valves. It will be understood that any ram movement is possible independently, so that: top cylinder 14 may be advanced by setting valve 80 to the forward position, closing valve 91 and closing valve 83.

Likewise the lower cylinder 15 can be advanced by setting valve 80 to the forward position, closing valve 91 and closing valve 82 leaving valve 83 open. The upper cylinder can be retracted by setting valve 80 to the return position, setting valve 86 to the top position and closing valve 91. Similarly bottom cylinder 15 can be retracted by setting valve 80 to the return position, setting valve 86 to the bottom position and closing valve 91. Having advanced both hydraulic rams, are with the changeover value set to connect the screw extruder 46 to the top extruder barrel 20, the screw is started to deliver compound through the changeover valve into the top barrel. This pushes back the piston of the top barrel which in turn causes the hydraulic ram to displace hydraulic fluid from the back of the ram to tank via conduit 76a with valve 80 set to the return position. This time the bottom cylinder 15 remains stationary. It has been found that seal friction for the extrusion pistons create sufficient retract resistance when filling a barrel to consolidate an air free charge of rubber in the barrel being filled from the screw extruder.

When the ram of the barrel being filled reaches its rear position, sensor 62 switches the screw extruder off. The top barrel is now filled with consolidated air free rubber. The changeover valve 50 is actuated to connected the screw extruder to the bottom barrel. Valves 82, 83, 80 and 86 are switched to neutral. The rearward end of ram 14 is then connected directly to the rearward end of ram 15 via conduit 76a, 76b. The hydraulic pump now has no effect on the supply to the rams 14, 15 but is free to operate the changeover valve via cylinder 93 when required. When not actually operating the changeover ram, the pump is free to circulate at minimal pressure via the relief valve 90.

With screw extruder on, the lower extruder barrel 20 is charged by the extruder and, in so doing, the piston of the upper barrel is advanced by hydraulic fluid from the retracting ram of the lower barrel as previously described to deliver extrudate through the valve 50. As material is extruded, the cutter blade 29 is repeatedly operated to sweep across the die face to sever the extrudate under the control of the linear encoder to form pieces of extrudate of equal volume. When the trigger 61 of the piston rod 19 of the upper ram actuates the proximity switch 62, the hydraulic ram 93 for the changeover valve is operated to switch flow of extrudate from the screw extruder between the extruder barrels and to establish flow of extrudate from the recharged barrel to the outlet 28. Extrusion continues until a supply of rubber or other material being extruded to the screw extruder is exhausted or until the screw extruder is switched off. Any residual material in the apparatus can then be discharged by advancing first one of the extruders and then the other to the full limit of its forward travel. To remove any final residual material from the apparatus after the end of an extrusion operation, the extrusion barrels are retracted on the slide rails to enable material remaining at the front of the extrusion barrels to be removed and any material present in the ports in the valve to be removed. It will be noted that all the ports in the valve diverge outwardly facilitating the removal of any residual material in the ports. Likewise the cutter head can be swung to one side to enable any final material to be removed from the outlet 28.

Although the apparatus described above embodies a screw extender, other forms of pumps for supplying the flowable material may be utilised according to the nature of the material.

Both extruder barrels 20, the valve mounting plate 30 and the screw extruder 46 have temperature controlled water circulation systems for maintaining a pre-set temperature of those components. The temperature is set according to the material being extruded.

I claim:

1. An apparatus for extruding and forming blanks from a flowable material comprising a pair of hydraulic ram operated extruders having outlets for delivering an extrudate of said flowable material, a means for feeding a supply of the flowable material to be extruded, valve means connecting the supply means to the outlets of the ram extruders and having a common outlet for delivery of extrudate from one or other of the ram extruders, the valve means being operable to connect the supply means to one of the ram extruders to fill that extruder whilst the other extruder is connected to the common outlet to deliver extrudate thereto and vice versa a closed hydraulic circuit linking the hydraulic rams of the two ram operated extruders whereby filling of the extruder of one ram operated extruder causes the hydraulic ram of that extruder to retract forcing hydraulic fluid from that ram through the hydraulic circuit to the ram of the other extruder to extend that other ram of the other extruder to discharge material in the extruder through the valve mechanism to the common outlet and vice versa and means to sever repeatedly the extrudate at the outlet in accordance with the rate of delivery of extrudate to form blanks of substantially equal volume.

2. An apparatus as claimed in claim 1, wherein control means are provided for the extrudate severing means responsive to movement of one of the hydraulic rams to sever the extrudate at intervals corresponding to a predetermined movement of the ram and thereby produce blanks of substantially uniform volume.

3. An apparatus as claimed in claim 1, wherein the means for feeding flowable material to the valve means comprises a screw extruder or other form of pump.

4. An apparatus as claimed in claim 1, wherein means are provided for automatically switching said valve means from said one position to the other position in response to completion of advance of one ram and completion of retraction of the other ram and vice versa.

5. An apparatus as claimed in claim 4, wherein each ram has a follower member moving with the ram and spaced proximity switches are provided to detect and limit of the stroke of the ram for automatically operating said switching means.

6. An apparatus as claimed in claim 1, wherein the valve means comprise a valve body having a valve chamber in which a movable valve member is mounted, the valve body has spaced valve ports opening into the chamber connected to the ram extruders, screw extruder and common outlet and controlled by the valve member.

7. An apparatus as claimed in claim 6, wherein the valve body has a cylindrical sleeve providing said valve chamber, said ports are spaced around the sleeve and the valve member is mounted for rotation in the sleeve for selectively coupling the screw extruder to one of the ram extruders and the other extruder to the common outlet and vice versa.

8. An extrusion apparatus as claimed in claim 1, wherein the common outlet is adapted to receive an extrusion die and the cutter means comprise a cutter blade mounted adjacent the die to sweep across to sever the extrudate emerging therefrom.

9. An extrusion apparatus as claimed in claim 8, wherein means are provided to monitor advance and retraction of one of the rams and to operate the cutter means each time a predetermined movement of the ram has taken place indicating a predetermined volume of material extruded.

* * * * *